Feb. 27, 1973  J. M. STEWART  3,718,340
DRILL CHUCK
Filed Oct. 26, 1971  4 Sheets-Sheet 1
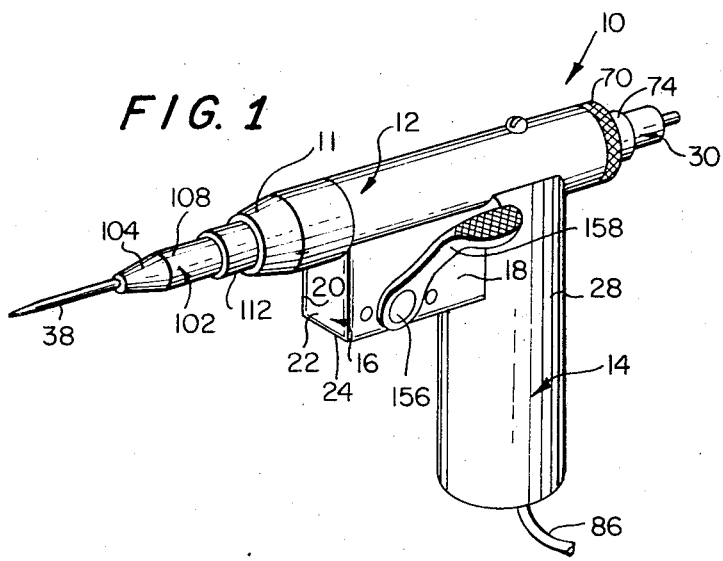
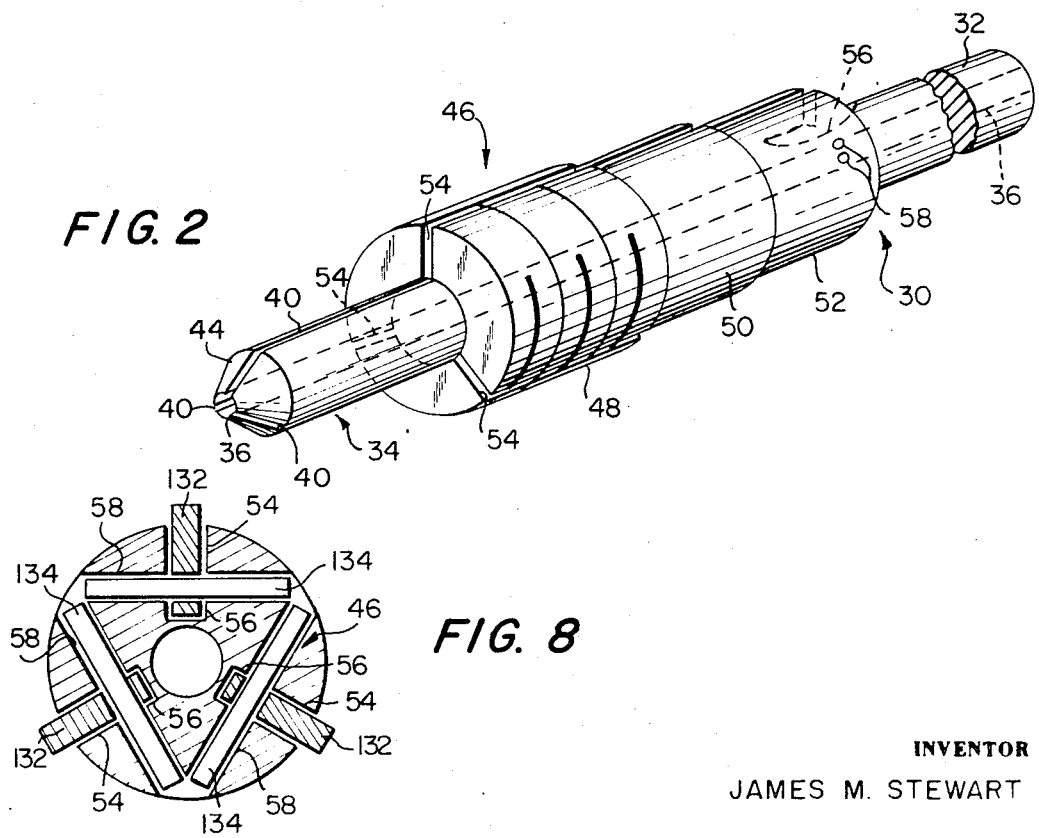
INVENTOR
JAMES M. STEWART
BY *Finnegan, Henderson & Farabow*
ATTORNEYS Feb. 27, 1973  J. M. STEWART  3,718,340
DRILL CHUCK
Filed Oct. 26, 1971  4 Sheets-Sheet 2
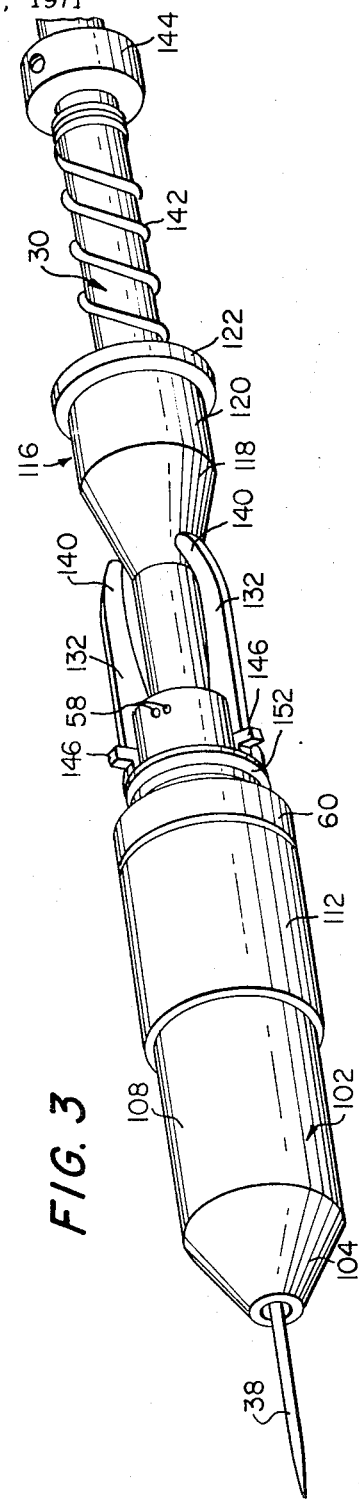
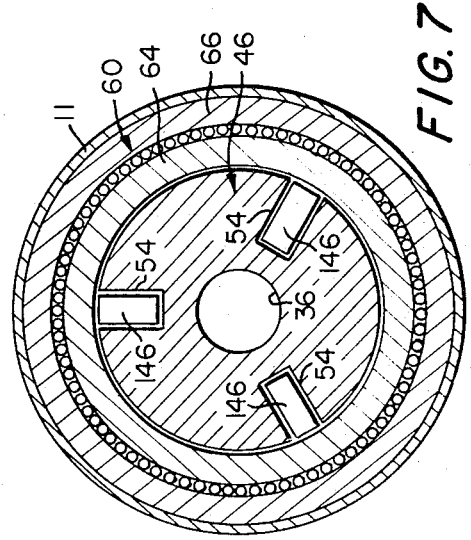
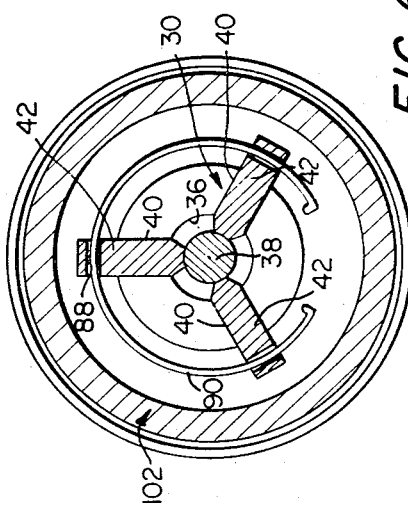
INVENTOR
JAMES M. STEWART
BY *Finnegan, Henderson & Farabow*
ATTORNEYS Feb. 27, 1973   J. M. STEWART   3,718,340
DRILL CHUCK
Filed Oct. 26, 1971   4 Sheets-Sheet 3
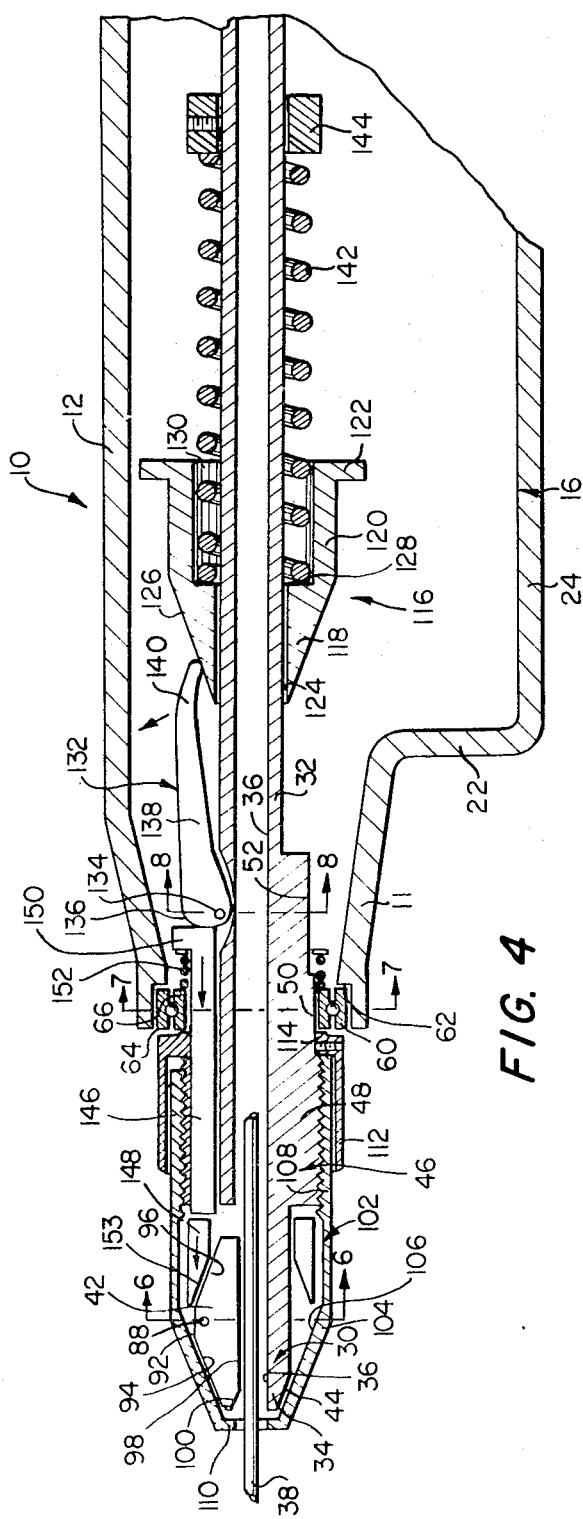
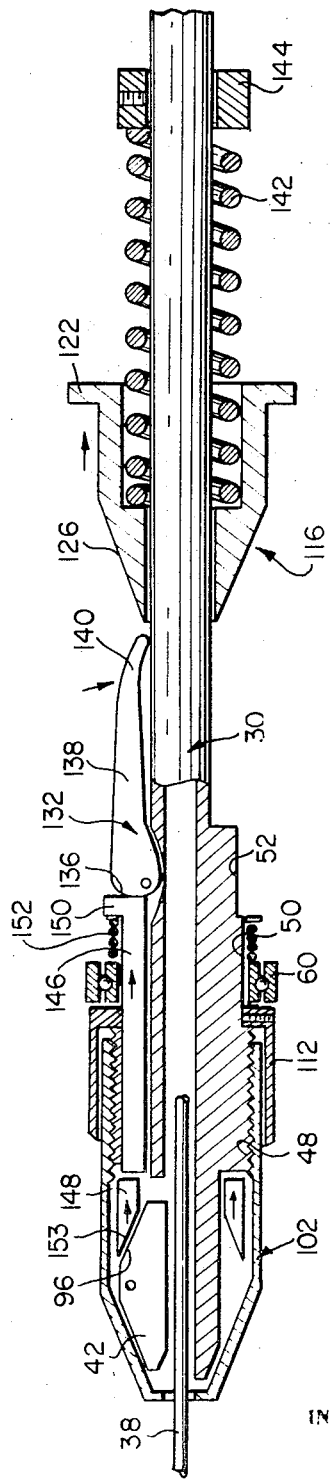
INVENTOR
JAMES M. STEWART
BY *Finnegan, Henderson & Farabow*
ATTORNEYS

United States Patent Office 3,718,340
Patented Feb. 27, 1973

3,718,340
DRILL CHUCK
James M. Stewart, West Palm Beach, Fla., assignor to Stewart Research, Inc., West Palm Beach, Fla.
Filed Oct. 26, 1971, Ser. No. 192,528
Int. Cl. B23b *31/10*
U.S. Cl. 279—57                                            16 Claims

ABSTRACT OF THE DISCLOSURE

A drill chuck is provided having a chuck sleeve for controlling the position of a plurality of gripping jaws relative to a rotatable shaft for holding a workpiece and a camming mechanism for applying gripping force to the jaws. The camming mechanism comprises a hollow camming slide mounted on an intermediate portion of the shaft, cam means connected to the shaft forwardly of and engageable with the slide, resilient means for continuously urging the slide toward the forward end of the shaft to engage and actuate the cam means, and transmitting means connecting the jaws with the cam means to force the jaws inwardly and grip the workpiece at the forward end of the shaft upon actuation of the cam means.

---

This invention relates to a drill chuck, and more particularly to drill chucks for use with surgical instruments.

In the past, there have been many types of drill chucks for holding a workpiece in the mouth of the chuck. For example, semi-automatic chucks have been developed which hold a workpiece against rotational force and against displacement in the drilling process, but this type of semiautomatic chuck releases the workpiece when a force tends to withdraw the workpiece from the chuck. This factor creates a hazard in that the length of workpiece protruding from the chuck can be inadvertently lengthened and is particularly important when the drill chuck is to be used for placement of Kirshner pins which are used in surgery for placement in bone. Prior drill chucks have not been suitably designed to satisfy the requirements of holding these pins and easily releasing them when desired.

Accordingly, it is an object of the present invention to provide a novel drill chuck for holding a workpiece which can be used for drilling or withdrawing procedures while still providing one hand convenient operation.

It is a further object of this invention to provide a drill chuck which can receive and hold a wide range of diameters of workpieces and which can receive different length workpieces.

It is a further object of this invention to provide a drill chuck which can easily release workpieces held therein and which easily receives the workpieces and applies a large holding force to them.

Additional objects and advantages of the invention will be set forth in part in the description which follows, and in part will be obvious from the description, or may be learned by practice of the invention, the objects and advantages being realized and attained by means of the instrumentalities and combinations particularly pointed out in the appended claims.

To achieve the foregoing objects and in accordance with its purpose, as embodied and broadly described, the present invention provides a drill chuck for gripping a workpiece and comprises a rotatable shaft mounted within a housing for receiving the workpiece, a plurality of retractable gripping jaws movable radially relative to the shaft for gripping the workpiece, a chuck sleeve mounted on the forward end of the shaft for controlling the position of the jaws, a hollow camming slide mounted on an intermediate portion of the shaft, cam means connected to the shaft forwardly of and engageable with the slide, resilient means for continuously urging the slide toward the forward end of the shaft to engage and actuate the cam means, and transmitting means connecting the jaws with the cam means to force the jaws inwardly and grip the workpiece at the forward end of the shaft upon actuation of the cam means.

Preferably, the gripping jaws have a rear inclined surface, and the transmitting means comprises a plurality of push rods engaged by the cam means and a hollow cone mounted forwardly of and actuated by the push rods, the cone having an internal frusto-conical surface corresponding to the rear inclined surface of the gripping jaws so that the jaws are forced inwardly against the workpiece upon actuation of the cam means.

It is also preferred that the cam means comprises a plurality of cam levers each having a cam surface at its forward end and which are movable radially outwardly of the shaft by the camming slide to apply a camming force to the transmitting means.

A control means is preferably provided to overcome the bias of the resilient means, release the gripping force on the jaws and permit the jaws to move radially outwardly of the shaft so that the workpiece can be removed or adjusted longitudinally with respect to the chuck.

It is desirable in some applications to provide a drive means to rotate the rotatable shaft with sufficient speed to centrifugally force the cam levers radially outwardly of the shaft and thereby increase the camming force applied to the transmitting means.

It is to be understood that both the foregoing general description and the following detailed description are exemplary and explanatory, but are not restrictive of the invention.

The accompanying drawings illustrate an example of a preferred embodiment of the invention and, together with the description, serve to explain the principles of the invention.

Of the drawings:

FIG. 1 is a perspective view of a drill chuck constructed in accordance with the teachings of the present invention.

FIG. 2 is a perspective view of a rotatable shaft for receiving a workpiece constructed in accordance with this invention.

FIG. 3 is a partial perspective view of an assembly of parts that are mounted in a top section of the housing shown in FIG. 1.

FIG. 4 is a partial vertical sectional view of the instrument shown in FIG. 1 and showing the drill chuck in a workpiece engaging position.

FIG. 5 is a partial vertical sectional view similar to FIG. 4 and showing the drill chuck in a workpiece disengaging position.

FIG. 6 is a vertical sectional view taken along lines 6—6 of FIG. 4 and showing the complete cross-section at this point.

FIG. 7 is a vertical sectional view taken along lines 7—7 of FIG. 4 and showing the complete cross-section at this point.

FIG. 8 is a vertical sectional view taken along lines 8—8 of FIG. 4 and showing the complete cross-section at this point.

Figure 9:
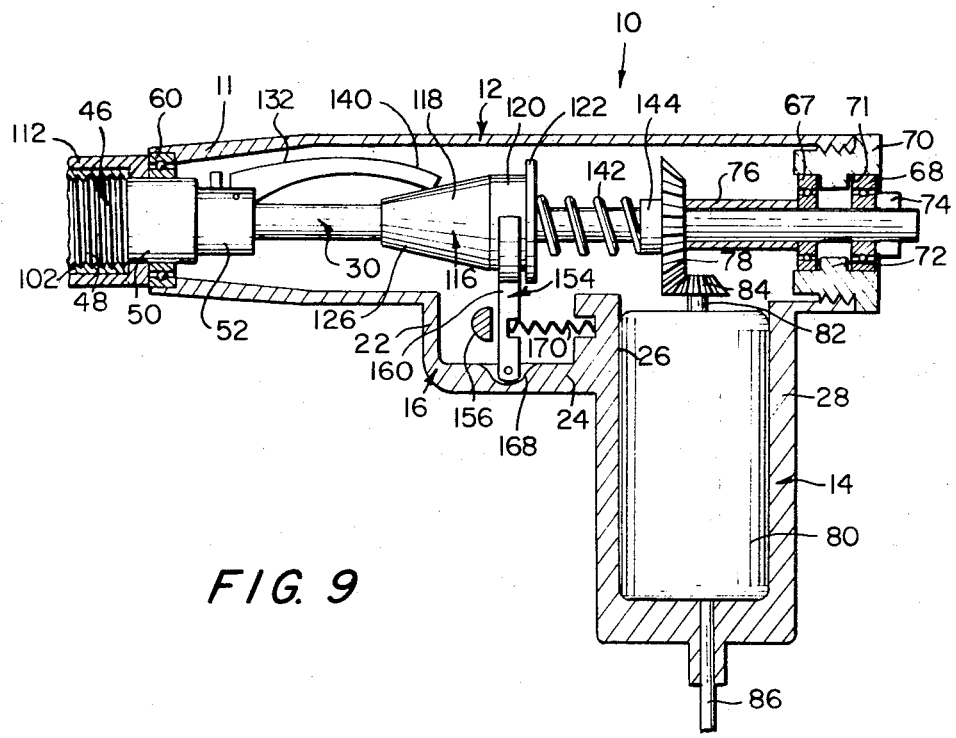
FIG. 9 is a partial vertical sectional view of the instrument shown in FIG. 1 and showing the assembly of parts in the housing.

As best seen in FIGS. 1 and 9, the drill chuck of the present invention is mounted in a housing, generally 10. Housing 10 comprises a generally cylindrical horizontally extending top section, generally 12, a cylindrical base section, generally 14, which extends downwardly from the rear of top section 12, and a control section, generally 16, forwardly of section 14.

Top section 12 has a frusto-conical front portion 11 which is open. Control section 16 is generally rectangular in cross-section and has two opposing side walls 18 and 20, a front wall 22, a bottom wall 24 and a back wall 26 which is formed integral with the top of cylindrical wall 28 of base section 14. The tops of control section 16 sec-28 of base section 14. The tops of control section 16 and base section 14 open into the bottom of top section 12.

In accordance with the invention, a rotatable shaft is mounted within the housing for receiving and rotating a workpiece. As here embodied, and as best seen in FIGS. 1 and 9, a rotatable shaft, generally 30, is mounted in top section 12.

As best seen in FIGS. 2, 4, and 5, shaft 30 is a generally cylindrical hollow body defined by a cylindrical shaft wall 32. A work receiving section, generally 34, is at the front of the shaft 30 and has a central bore 36 which defines the largest diameter workpiece that can be gripped by the chuck. Bore 36 axially extends the length of shaft 30 and has a constant diameter throughout. Use of a hollow shaft enables the chuck to receive workpieces of any length and therefore is particularly suitable for operation with a Kirschner pin 38, as illustrated in FIGS. 1, 4 and 5. As is apparent to those skilled in the art, shaft 30 need not be hollow throughout, and can be hollow at its front only to receive shorter length workpieces.

As best seen in FIGS. 2 and 6, a plurality of axially extending slots, here embodied as three slots 40, are cut into shaft wall 32 of work receiving section 34 to receive an equal number of gripping jaws 42 to hold the workpiece. Slots 40 preferably are equally spaced from each other around the circumference of shaft 30 and open into central bore 36 of the shaft. The front of work receiving section 34 has an external frusto-conical surface 44 which diverges toward the rear of shaft 30.

As best seen in FIGS. 2, 4 and 9, a collar, generally 46, is integrally formed on shaft 30 immediately adjacent work receiving section 34. Collar 46 comprises an externally threaded forward portion 48, an intermediate bearing portion 50, and a reduced end portion 52. As seen in in FIGS. 2 and 7, three transmitting slots 54 are cut into collar 46 with each transmitting slot 54 being axially aligned with a corresponding slot 40 in work receiving section 34. Transmitting slots 54 extend the entire length of collar 46, and extend radially through the thickness of the collar to terminate at the outside surface of shaft wall 32. As seen in FIGS. 2, 4 and 8, a cam groove 56 is cut into shaft wall 32 immediately below each transmitting slot 54 at the back of reduced end portion 52 of collar 46. Each groove 56 extends a short distance beyond the end portion 52 toward the rear of shaft 30. As best seen in FIG. 8, a pivot hole 58 perpendicularly intersects each transmitting slot 54 immediately above cam groove 56 and extends through collar 46 as a chord of the collar.

In accordance with one embodiment of the invention, and as seen in FIGS. 3, 4 and 9, a shaft support is mounted about shaft 30 to support it near the working end of the chuck. In a preferred embodiment, the support comprises a ball bearing 60 mounted between bearing portion 50 of collar 46 and front portion 11 of top section 12 of housing 10. The inner surface of front portion 11 has a shoulder 62 (FIG. 4) to seat bearing 60 therein. Ball bearing 60 has an inner member 66 which snugly engages collar 46 and an outer member 64 that engages shoulder 62 in the front portion 11 of housing 10 to permit relative rotation between the housing and shaft 30.

As seen in FIG. 9, shaft support is also provided at the rear of shaft 30 by an inner ball bearing 67 and an outer ball bearing 68 mounted between shaft 30 and an end cap 70 that is removably secured to housing 10. In the embodiment shown, cap 70 is externally threaded and mates with a corresponding internal thread in the back end of top section 12. Further, cap 70 has an internal bore 71 that has an inner reduced diameter at its center (see FIG. 9) formed by an extension 72 to divide cap 70 into inner and outer sections for receiving bearings 67 and 68, respectively.

Shaft 30 extends beyond the end cap 70, and an annular ring 74 is adjustably secured to this extension of the shaft by, for example, set screws (not shown). Ring 74 contacts the inner member of outer bearing 68 to retain the bearing in its bearing receiving section and the shaft in relationship with housing 10. The inner member of inner ball bearing 67 is firmly fixed to shaft 30 and engages a tubular spacer 76 to retain the shaft in position in the housing. Spacer 76 contacts a drive bevel gear 78 that transmits rotary power from a motor 80 to shaft 30. Inner bearing 67 thus provides rotational support for shaft 30 and reacts to the thrust of the force required in drilling.

Shaft 30 can be rotated by any suitable driven means, such as the electrically powered gear motor 80, shown in FIG. 9, and mounted in base section 14 of housing 10. As shown, a drive shaft 82 extends from gear motor 80, and a bevel gear 84 is mounted thereon. Bevel gear 78 is fixedly mounted to shaft 30 and engages bevel gear 84 to transmit rotary power from motor 80 to shaft 30. An electrical lead 86 extends from the bottom wall of base section 14 of housing 10 to provide a connection between gear motor 80 and a source of electricity for driving the motor.

In accordance with the invention, a plurality of retractable gripping jaws are radially movable relative to the shaft for gripping the workpiece. As here embodied, and as best seen in FIGS. 4, 5 and 6, three gripping jaws 42 are mounted within slots 40 of shaft 30. As best seen in FIG. 6, each jaw 42 has a hole 88 near its top edge which extends through its thicknes. An expansion spring 90 extends through each of these holes to bias all of the jaws radially outwardly of shaft 30. As seen in FIGS. 4 and 5, the top edge of each jaw 42 has a flat center surface 92, a forward inclined surface 94 and a rear inclined surface 96. Forward inclined surface 94 tapers downwardly toward the front of the instrument, and rear inclined surface 96 oppositely tapers downwardly toward the rear. Each jaw 42 has a bottom flat surface 98 for engaging and gripping the workpiece 38 to hold it in drilling position. The front portion of bottom flat surface 98 of each gripping jaw 42 is provided with a bevel 100 to facilitate spreading of the jaws in the event that they stick when too large a workpiece is introduced into the chuck.

In accordance with the invention, a chuck sleeve is mounted on the forward end of the shaft for controlling the position of the jaws. As here embodied, and as best seen in FIGS. 3 and 4, the chuck sleeve, generally 102, comprises a rear cylindrical section 108 and a frusto-conical front section 104 having an internal frusto-conical surface 106 conforming substantially to the frusto-conical surface 44 of shaft 30 and the forward inclined surface 94 of jaws 42. The internal surface of cylindrical section 108 is threaded to engage threaded forward portion 48 of collar 46. A rim 110 extends inwardly from the front of frusto-conical section 104 and has a central opening to permit the workpiece to enter the chuck.

In accordance with one embodiment of the invention, and as seen in FIG. 4, a cylindrical sleeve cover 112 surrounds the back of cylindrical section 108 of chuck sleeve 102. Sleeve cover 112 has an inwardly extending lip 114 at its back, and a set screw extends through the lip to secure the cover to bearing portion 50 of collar 46 of shaft 30. Lip 114 is placed at the forward end of bearing portion 50 and aids in retaining ball bearing 60 in shoulder 62 of housing 10.

In accordance with the invention, a hollow camming slide is mounted on an intermediate portion of the shaft. As here embodied, and as best seen in FIGS. 3 and 4, the camming slide, generally 116, comprises a frusto-conical forward section 118 and annular sleeve section 120 spaced from shaft 30. Sleeve 120 terminates in an outwardly extending flange 122. Frusto-conical section 118 has a smooth internal bore 124 to permit camming slide 116 to easily move in either a forward or backward axial direction on shaft 30 and an external tapered camming surface 126 that diverges toward the rear of the device. Camming slide 116 also has an internal annular recess 130 at its back that terminates at an internal shoulder 128.

In accordance with the invention, cam means are pivotally connected to the shaft forwardly of the camming slide and are engageable with the slide. As here embodied, and as shown in FIGS. 3, 4 and 8, the cam means comprise three cam levers 132. As best seen in FIG. 8, a pin 134 is positioned within each hole 58 of collar 46 and extends through a pivot hole at the forward end of each cam lever 132 to pivotally mount each lever within one of the cam slots 54 in reduced end portion 52 of collar 46. As best seen in FIG. 4, the forward end of each cam lever 132 has a rounded cam surface 136 and is connected by a shank 138 to a back end 140 which curves radially inwardly toward the center of shaft 30.

In accordance with the invention, resilient means are provided for continuously urging the slide toward the front end of the shaft to engage and activate the cam means. As here embodied, and as shown in FIG. 4, this means comprises a coiled main compression spring 142 which is positioned within recess 130 and abuts against shoulder 128 of slide 116 at one end, and against a stop 144 secured to shaft 30 by a set screw at its other end. As more fully described below in connection with the operation of the device, spring 142 urges slide 116 toward the forward end of the shaft 30 and into engagement with cam levers 132.

In accordance with the invention, transmitting means connect jaws 42 with the cam means to force the jaws inwardly and grip the workpiece upon actuation of the cam means. As here embodied, the transmitting means comprises three push rods 146 (FIGS. 4 and 7) that are mounted for axial movement in transmitting slots 54 of collar 46, and a hollow cone 148 (FIGS. 4 and 5) mounted forwardly of the push rods and about gripping jaws 42. Each push rod 146 is generally rectangular in cross-sectional shape and is longer than its corresponding transmitting slot 54.

Push rods 146 are maintained within transmitting slots 54 by ball bearing 60 which tightly fits about bearing portion 50 of collar 46. The back end of each push rod extends rearwardly of ball bearing 60 and has an outwardly extending flange 150 which engages cam surface 136 of a corresponding cam lever 132. A light compression spring 152 is mounted about push rods 146 between the annular flange 150 and ball bearing 60 to bias the push rods against the cam levers 132.

Hollow cone 148, as best seen in FIGS. 4 and 5, has an internal frusto-conical surface 153 which corresponds to the rear inclined surfaces 96 of gripping jaws 42 and a flat back end face which engages the flat front face of push rods 146. Hollow cone 148 is mounted for axial movement about shaft 30.

As is apparent to those of ordinary skill in the art, the transmitting means of the present invention can take other forms than that shown here. For example push rods 146 can have a cylindrical cross-sectional shape and be contained in longitudinally extending closed transmitting holes formed in collar 46 instead of the open transmitting slots 54 shown here.

In accordance with a preferred embodiment of the invention, control means are provided to overcome the bias of the resilient means and permit the jaws to move radially outwardly of the shaft. As here embodied, the control means comprises a yoke, generally 154 (FIGS. 9 and 10) engageable with camming slide 116, a cam 156 for moving yoke 154 into and out of driving engagement with camming slide 116, and a thumb lever 158 (FIG. 1) for controlling movement of cam 156.

Figure 10:
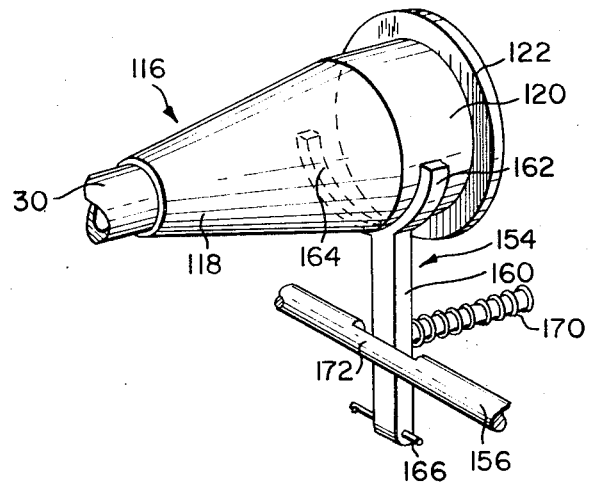
FIG. 10 is a perspective view of a camming slide constructed in accordance with the teachings of the present invention and a yoke for moving the slide.

As shown in FIG. 10, yoke 154 comprises a vertical yoke shaft 160 and curved bifurcated arms 162 and 164 that are shaped to conform to the outer surface of annular sleeve 120 of camming slide 116. A pivot 166 is journaled into the opposite side walls 18 and 20 of control section 16 of housing 10 and extends across a groove 168 (FIG. 9) cut into the internal surface of bottom wall 24 of the control section immediately below annular sleeve 120 of camming slide 116. The bottom of yoke shaft 160 is rounded to ride within groove 168 and is pivotally mounted on pivot 166. A compression spring 170 abuts against yoke shaft 160 and an internal surface of back wall 26 of control section 16 to normally urge yoke 154 toward the front of the instrument and out of engagement with annular flange 122 of camming slide 116.

Cam 156 comprises a cylindrical shaft that extends horizontally through control section 16 and is journaled in side walls 18 and 20 of the control section. The portion of cam 156 that is immediately adjacent yoke shaft 160 is cut away to provide a half cylinder 172 (FIG. 10) having a flat face that normally faces the yoke shaft. One end of cam 156 extends externally of control section 16 and thumb lever 158 is attached to this end (FIG. 1). Thumb lever 158 normally extends upwardly and rearwardly from its attachment to cam 156 and has a flat top surface conforming to the shape of the operator's thumb.

In normal position without a workpiece in the drill chuck, main spring 142 of the instrument biases camming slide 116 toward the front of shaft 30 so that camming surface 126 of the slide engages the back ends 140 of each cam lever 132 thereby rotating the cam levers outwardly of shaft 30 about pivot pins 134 to produce a cam effect at rounded cam surface 136. Rotation of cam surface 136 produces a camming force upon each push rod 146 that overcomes the bias of spring 152 and forces the push rods toward the front of the instrument. Each rod in turn engages hollow cone 148 and pushes it forward.

Forward movement of hollow cone 148 brings its internal frusto-conical surface 153 into contact with the rear inclined surfaces 96 of gripping jaws 42 to move the gripping jaws forwardly against inner frusto-conical surface 106 of chuck sleeve 102 and then, overcoming the bias of expansion of spring 90, radially inwardly under a large gripping force.

To insert a workpiece within the drill chuck, thumb lever 158 is pressed downwardly to rotate cam 156 and bring it into contact with yoke shaft 160 to pivot the yoke against annular flange 122 of camming slide 116. Movement of yoke 154 against annular flange 122 overcomes the bias of main compression spring 142 and forces camming slide 116 toward the rear of shaft 30. This releases the camming force exerted on push rods 146 and enables spring 152 to move the push rods toward the rear of shaft 30 and pivot cam levers 132 toward shaft 30. (See FIG. 5.) Such movement, in turn, releases the force applied to hollow cone 148 and enables expansion spring 90 to pull gripping jaws 42 radially outwardly against chuck sleeve 102.

The extent of outward radial movement of gripping jaws 42 is governed by the position of chuck sleeve 102 which can be longitudinally adjusted by rotating it with respect to collar 46. As can be seen by reference to the drawings, a forward position of chuck sleeve 102 permits gripping jaws 42 to move further outward than a rear position of the chuck sleeve and thus enables a larger diameter workpiece to be inserted in the chuck.

Chuck sleeve 102 is therefore adjusted to permit gripping jaws 42 to expand to a diameter slightly larger than the workpiece to be inserted. To aid in this initial adjustment, chuck sleeve 102 can be provided with an index on its outer cylindrical surface which will move axially relative to sleeve cover 112 upon adjustment of the chuck sleeve, and be read at the forward edge of the sleeve cover. Generally, when the device of the present invention is to be used in surgical procedures, no other markings are provided on chuck sleeve 102 because its surface may come into contact with live tissue and therefore should be smooth.

The workpiece is then inserted in the chuck and chuck sleeve 102 is adjusted to move gripping jaw 42 inwardly until further adjustment of the chuck sleeve meets with resistance. Chuck sleeve 102 is then loosened slightly and thumb lever 158 is released to allow spring 170 to move yoke 154 out of engagement with annular flange 122 of camming slide 116 and permit main compression spring 142 to move the slide forwardly. As explained above, forward movement of camming slide 116 causes gripping jaws 42 to move radially inwardly under a large gripping force which is now exerted on the workpiece to hold it securely in the chuck. Thus, adjustment of chuck sleeve 102 enables workpieces of different diameters to be easily positioned within the chuck and provides a slight holding force on the workpiece, and release of thumb lever 158 provides the mechanical advantage necessary for strong gripping action.

After the workpiece is firmly gripped in the chuck, motor 80 is actuated by a suitable switch (not shown) to transmit rotary power to shaft 30. When the drill is used for the placement of Kirschner pins, the motor desirably generates high torque at low speeds. It is understood, however, that high speeds can also be utilized. When high speeds are used, rotation of shaft 30 causes centrifugal force to be applied to cam levers 132 to further move these levers outwardly of the shaft and generate a greater camming and gripping force.

After the workpiece has been drilled to its proper depth, or if readjustment of its length is desired, thumb lever 158 is depressed to loosen the grip on the workpiece. The workpiece can then be removed entirely or adjusted longitudinally and regripped as before in a new location. When a workpiece having a grossly different diameter is to be subsequently used, chuck sleeve 102 is readjusted as indicated previously.

In another embodiment of the invention, an antifriction bearing can be placed between yoke 154 and annular sleeve 120 of camming slide 116 to allow rotation of shaft 30 and the camming slide regardless of whether the yoke is in its normal position or engaged with annular flange 122 of the camming slide to thereby permit chucking and releasing workpieces while the shaft is rotating.

The invention thus provides a new and improved drill chuck, particularly for use in a surgical instrument for the placement of Kirschner pins, that provides satisfactory gripping of the pin near the front end of the instrument to prevent rotational slippage or wobbling of the pin while easily and efficiently permitting release, and, if desired, longitudinal adjustment and regripping of the pin within the chuck. By locating the force creating mechanism inwardly of the housing and then transmitting the force toward the forward end of the drill for gripping the pin in accordance with the present invention, a more powerful gripping force can be provided than if the force creating mechanism were located up near the front end of the drill. Further, by transmitting the force forward, the pin can be prevented from wobbling with respect to the housing which could occur if the pin were gripped inwardly of the instrument and adjacent the force creating mechanism.

The invention in its broader aspects is not limited to the specific details shown and described and departures may be made from such details without departing from the principles of the invention and without sacrificing its chief advantages.

What is claimed is:

1. A drill chuck for gripping a workpiece and having a housing comprising:
    (a) a rotatable shaft mounted within the housing for receiving the workpiece;
    (b) a plurality of retractable gripping jaws movable radially relative to the shaft for gripping the workpiece;
    (c) a chuck sleeve mounted on the forward end of said shaft for controlling the position of said gripping jaws;
    (d) a hollow camming slide mounted on an intermediate portion of the shaft;
    (e) cam means connected to said shaft forwardly of and engageable with said slide;
    (f) resilient means for continuously urging the slide toward the forward end of the shaft to engage and actuate the cam means; and
    (g) transmititng means connecting said jaws with the cam means to force the jaws inwardly and grip the workpiece at the forward end of the shaft upon actuation of said cam means.

2. The drill chuck of claim 1, wherein the gripping jaws have a rear inclined surface and the transmitting means comprises a plurality of push rods engaged by the cam means and a hollow cone mounted forwardly of and actuated by the push rods, said cone having an internal-frusto conical surface corresponding to the rear inclined surface of the gripping jaws to force the jaws inwardly and hold the workpiece upon actuation of the cam means.

3. The drill chuck of claim 2, wherein said rotatable shaft has a collar with a plurality of axially extending transmitting slots and said push rods are mounted within said slots.

4. The drill chuck of claim 3 wherein said collar has a bearing portion and a bearing is mounted about said portion to provide shaft support and retain the push rods in the transmitting slots.

5. The drill chuck of claim 3 wherein said collar has an externally threaded portion and said chuck sleeve is threadably mounted on said threaded portion for axial movement thereon to adjust the position of the jaws.

6. The drill chuck of claim 2 wherein a compression spring normally urges said push rods into engagement with said cam means.

7. The drill chuck of claim 1 wherein said cam means comprises a plurality of cam levers each having a cam surface at its forward end and which are movable radially outwardly of said shaft by the camming slide to apply a camming force to said transmitting means.

8. The drill chuck of claim 7 wherein said camming slide has an inclined forward surface which is engageable with said cam levers for actuating said levers.

9. The drill chuck of claim 7 including drive means to rotate said rotatable shaft with sufficient speed to centrifugally force said cam levers radially outwardly of said shaft and thereby increase the camming force applied to the transmitting means.

10. The drill chuck of claim 1 including control means to overcome the bias of the resilient means, release the gripping force on the jaws, and permit the jaws to move radially outwardly of the shaft so that the workpiece can be removed or adjusted longitudinally with respect to the chuck.

11. The drill chuck of claim 1 wherein said control means comprises a yoke engageable with the camming slide, a cam for moving the yoke into and out of engagement with the camming slide and a thumb lever for controlling movement of the cam.

12. The drill chuck of claim 1 wherein said rotatable shaft includes a work receiving section and a collar immediately adjacent said work receiving section, said work receiving section having a bore to receive the workpiece and a plurality of axially extending slots corresponding to the number of gripping jaws to receive said gripping jaws, said collar having an externally threaded portion, a bearing portion and an end portion, said chuck sleeve is threadably mounted on said threaded portion for axial movement thereon to adjust the position of the jaws within said slots, and a bearing is mounted about said bearing portion to provide shaft support for said rotatable shaft at its forward end.

13. The drill chuck of claim 12 wherein said cam means comprise a plurality of cam levers pivotally mounted in said end portion.

14. The drill chuck of claim 13 wherein said transmitting means include a plurality of push rods engaged by the cam levers and a hollow cone mounted forwardly of and actuated by the push rods, said collar includes a plurality of axially extending transmitting slots, and said push rods are mounted in said slots.

15. The drill chuck of claim 1 wherein said camming slide comprises a frusto-conical forward section and an annular sleeve section terminating in an annular flange, said camming slide including an internal annular recess at its back that terminates in a shoulder, and said resilient means comprises a compression spring positioned within said recess.

16. The drill chuck of claim 15 including a yoke engageable with said annular flange for moving the camming slide against the bias of said compression spring to release the gripping force on the jaws, and permit the jaws to move radially outwardly of the shaft.

References Cited

UNITED STATES PATENTS 814,648    3/1906    Hanson _____ 279—55

FRANCIS S. HUSAR, Primary Examiner

U.S. Cl. X.R.

279—1 B, 15 G; 32—26; 173—163; 128—305, 92 EC